(12) United States Patent
Thomas et al.

(10) Patent No.: US 7,766,785 B2
(45) Date of Patent: Aug. 3, 2010

(54) MULTIPLE SPEED AUTOMATIC TRANSMISSION

(75) Inventors: Steve G. Thomas, Bloomfield Hills, MI (US); Donald E. Hoffman, Canton, MI (US); Gregory D. Goleski, Clarkston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 300 days.

(21) Appl. No.: 11/657,958

(22) Filed: Jan. 25, 2007

(65) Prior Publication Data

US 2008/0182704 A1  Jul. 31, 2008

(51) Int. Cl.
*F16H 3/62* (2006.01)
(52) U.S. Cl. .................................... 475/284
(58) Field of Classification Search ............... None
See application file for complete search history.

(56) References Cited

U.S. PATENT DOCUMENTS

| | | | |
|---|---|---|---|
| 6,752,738 B1 | 6/2004 | Martin et al. | |
| 6,976,931 B2 | 12/2005 | Raghavan et al. | |
| 7,032,258 B2 | 4/2006 | O'Hanlon | |
| 7,041,027 B2 | 5/2006 | Bucknor et al. | |
| 7,056,258 B2 | 6/2006 | Bucknor et al. | |
| 2003/0083174 A1* | 5/2003 | Tabata et al. ............... 475/323 |
| 2005/0247153 A1* | 11/2005 | Nozaki et al. ............ 74/473.11 |
| 2005/0255958 A1 | 11/2005 | Tiesler et al. | |
| 2005/0282680 A1 | 12/2005 | Soh | |
| 2007/0037657 A1 | 2/2007 | Thomas et al. | |
| 2007/0060438 A1 | 3/2007 | Fukuyama et al. | |
| 2007/0155568 A1 | 7/2007 | Ishii et al. | |

* cited by examiner

*Primary Examiner*—Sherry L Estremsky
*Assistant Examiner*—Erin D Bishop
(74) *Attorney, Agent, or Firm*—David B. Kelley; MacMillan, Sobanski & Todd, LLC

(57) ABSTRACT

A multiple-speed automatic transmission includes an input, output, a first gear unit drivable connected to the input and including a component rotating at the speed of the input and a first gear unit output, the first gear unit producing a gear ratio of a speed of the input and a speed of a first gear unit output, the gear ratio being greater than unity, and a Ravigneaux gear unit for producing multiple ratios of the speed of the input and a speed of the output, the Ravigneaux gear unit being driveably connected to first, second, third, fourth, fifth and sixth rotating members and the output. A first clutch connects the first gear unit output and the first rotating member; a second clutch connects the first gear unit output and the second rotating member; a third clutch connects the third rotating member and one of the input and the rotating component, a fourth clutch connects the fourth rotating member and one of the input and the component; a first brake holds the fifth rotating member against rotation; and a second brake holds the sixth rotating member against rotation.

14 Claims, 4 Drawing Sheets

| GEAR | 62 CLUTCH A | 64 CLUTCH B | 66 BRAKE C | 68 BRAKE D | 70 CLUTCH E | 72 CLUTCH F | RATIO | STEP |
|---|---|---|---|---|---|---|---|---|
| 1st | X | | | X | | | 6.3871 | 1.8261 |
| 2nd | X | | X | | | | 3.4977 | 1.5545 |
| 3rd | X | X | | | | | 2.2500 | 1.4459 |
| 4th | X | | | | | X | 1.5561 | 1.2516 |
| 5th | | | | | X | | 1.2433 | 1.2433 |
| 6th | | | | | X | X | 1.0000 | 1.2433 |
| 7th | | X | | | X | | 0.8065 | 1.2399 |
| 8th | | | X | | X | | 0.6984 | 1.1548 |
| LOW REV | | | | X | | | -5.2105 | |
| HIGH REV | | | | X | | X | -2.3158 | |

FIG. 2

| | SUN GEAR | RING GEAR | PINION TO SUN | PINION TO RING | SHARED PINION | BETA RATIO |
|---|---|---|---|---|---|---|
| PLAN 1 | 40 | 90 | 20 | 20 | | 2.2500 |
| PLAN 2A | 31 | 88 | 24 | | 25 | |
| PLAN 2B | 38 | | | | 25 | 2.3158 |

FIG. 3

| GEAR | 62 CLUTCH A | 64 CLUTCH B | 66 BRAKE C | 68 BRAKE D | 70 CLUTCH E | 72 CLUTCH F | RATIO | STEP |
|---|---|---|---|---|---|---|---|---|
| 1st | X | | | X | | | 7.0968 | |
| 2nd | X | | X | | | | 3.8863 | 1.8261 |
| 3rd | X | X | | | | | 2.5000 | 1.5545 |
| 4th | X | | | | | X | 1.6286 | 1.5351 |
| 5th | | | | | X | | 1.2680 | 1.2844 |
| 6th | | | | | X | X | 1.0000 | 1.2680 |
| 7th | | X | | | X | | 0.7942 | 1.2591 |
| 8th | | | X | | | | 0.6984 | 1.1372 |
| LOW REV | | X | | X | | | -5.7895 | |
| HIGH REV | | | | X | | X | -2.3158 | |

FIG. 5

| | SUN GEAR | RING GEAR | PINION TO SUN | SHARED PINION | BETA RATIO |
|---|---|---|---|---|---|
| PLAN 1A | 60 | 90 | | 15 | 1.5000 |
| PLAN 1B | 60 | | | 15 | |
| PLAN 2A | 38 | | | 25 | |
| PLAN 2B | 31 | 88 | 24 | 25 | -2.8387 |

FIG. 6

MULTIPLE SPEED AUTOMATIC TRANSMISSION

BACKGROUND OF THE INVENTION

1. Field of the Invention

This invention relates to the field of automatic transmissions for motor vehicles. More particularly, the invention pertains to a kinematic arrangement of gearing, clutches, brakes, and the interconnections among them in a power transmission.

2. Description of the Prior Art

A truck customer may desire improved vehicle launch capability, particularly when the vehicle is loaded and/or starting on a grade. The vehicle manufacturer offers customers options to improve vehicle launch capability. One option is to choose steeper, i.e., numerically higher, axle ratios. The transfer case of a 4×4 truck generally has two speeds, one speed is a low-range, which can also improve launch capability, the other speed is a 1:1 gear ratio.

The steeper axle ratios improve vehicle launch capability when loaded, but reduces fuel economy even when the vehicle is unloaded. Offering multiple axle ratios adds complexity to the vehicle assembly plant. Operators of light truck having 4×4 drivelines rarely use the low-range capability of a two-speed transfer case. The clutch mechanism for selecting low and high-ranges of the transfer case cannot be shifted unless the vehicle is stopped.

Most operators of such vehicle are accustomed to and prefer a small first-second gear step size of the transmission. Eight-speed transmissions that have been proposed have gear mesh losses that exceeded those of highly efficient six-speed transmissions.

There is a need for a power transmission that can produce eight forward speeds and two reverse speeds, has high theoretical gear mesh efficiency and a wide speed ratio span.

SUMMARY OF THE INVENTION

A multiple-speed automatic transmission includes (a) an input, (b) an output, (c) a first gear unit drivable connected to the input and including a component rotating at the speed of the input and a first gear unit output, the first gear unit producing a gear ratio of a speed of the input and a speed of a first gear unit output, the gear ratio being greater than unity, and (d) a Ravigneaux gear unit for producing multiple ratios of the speed of the input and a speed of the output, the Ravigneaux gear unit being driveably connected to first, second, third, fourth, fifth, and sixth rotating members and the output. A first clutch connects the first gear unit output and the first rotating member; a second clutch connects the first gear unit output and the second rotating member; a third clutch connects the third rotating member and an element rotating at transmission input speed, a fourth clutch connects the fourth rotating member and an element rotating at transmission input speed; a first brake holds the fifth rotating member against rotation; and a second brake holds the sixth rotating member against rotation.

The transmission can produce eight forward speeds and two reverse speeds, has high theoretical gear mesh efficiency and a wide speed ratio span. The eight-speed transmission provides two drive modes. Mode 1 could replace the conventional offering of optional axle ratios and the two speed transfer case. The transmission has a low-range first gear, which can either be used for launching the vehicle, such as when the operator is hauling a trailer, or as the low-range launch gear for 4×4 operations.

The transmission provides the ability to shift from low-range to high-range under full torque. When normal launch mode is required, the transmission provides a second gear with a conventional first-gear launch ratio. The seven speeds from second gear through eighth gear provide a close ratio gearbox with a span greater than five.

The transmission provides excellent fuel economy in normal drive mode. A manually operated selector switch for 4×4 vehicles can incorporate 4×2, 4×4 high and 4×4 low selectable positions, and can have added functions, such as 4×4 auto, trailer tow, and snow modes. These modes are achieved by starting the transmission in first, second or third gear and by using a 4×4 on demand clutch in off, stand-by or applied mode.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages of the present invention will become readily apparent to those skilled in the art from the following detailed description of a preferred embodiment when considered in the light of the accompanying drawings in which:

FIG. 2 is chart showing for each forward and reverse speed ratio the operating state of the clutches and brakes that control the transmission of FIG. 1, and a preferred speed ratio for each gear;

FIG. 3 is a chart showing a preferred number of gear teeth for each gear and pinion of the transmission of FIG. 1 and the beta ratios of the Ravigneaux and speed reduction gearsets;

FIG. 5 is chart showing for each forward and reverse speed ratio the operating state of the clutches and brakes that control the transmission of FIG. 4, and a preferred speed ratio for each gear; and FIG. 6 is a chart showing a preferred number of gear teeth for each gear and pinion of the transmission of FIG. 4 and the beta ratios of the Ravigneaux and speed reduction gearsets.

DESCRIPTION OF THE PREFERRED EMBODIMENT

Figure 1:
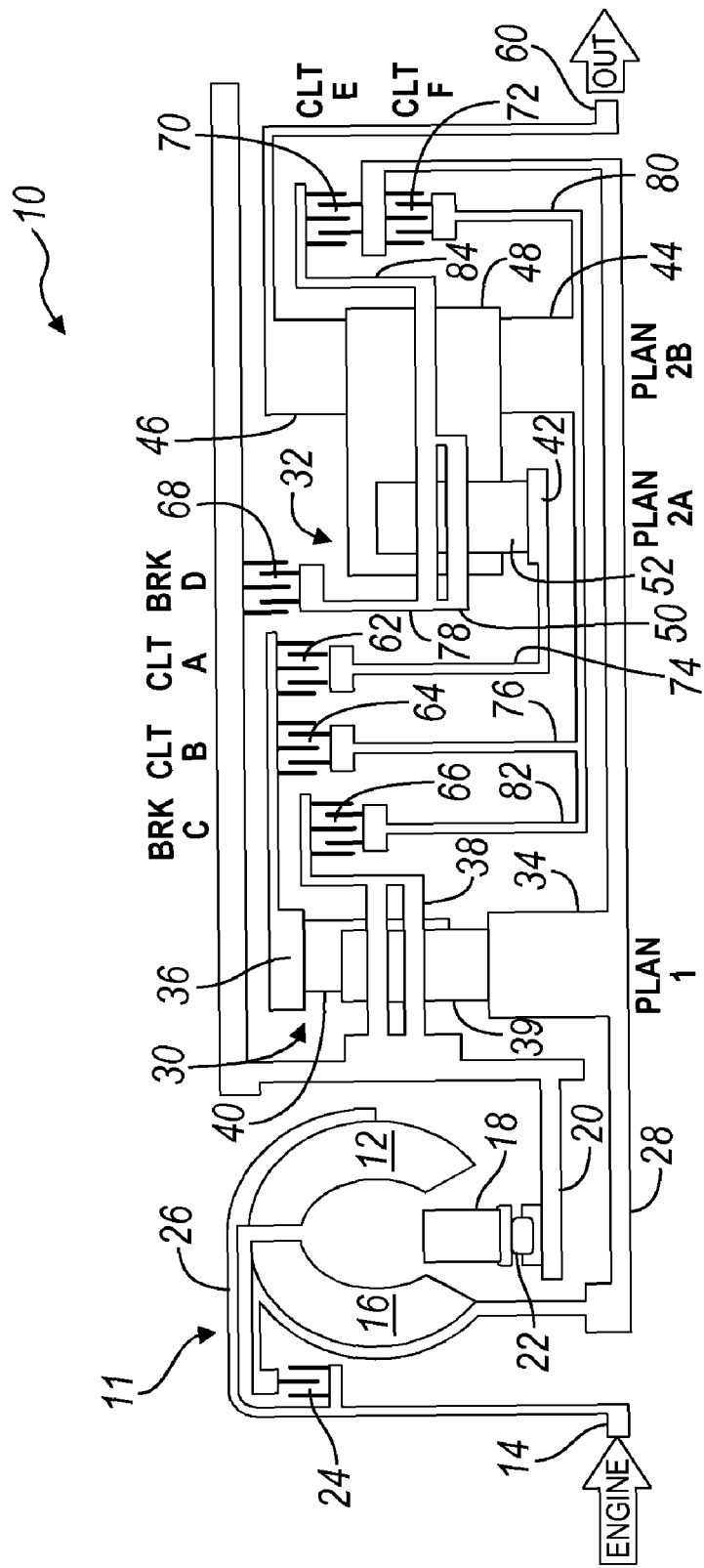
FIG. 1 is a schematic diagram illustrating the kinematic arrangement of a transmission, which incorporates a Ravigneaux gear set.

Referring now to the drawings, there is illustrated in FIG. 1 the kinematic arrangement of an automatic transmission 10. A torque converter includes a bladed impeller wheel 12 connected to the crankshaft 14 of an internal combustion engine, a bladed turbine wheel 16, and a bladed stator wheel 18. The impeller, stator and turbine wheels define a toroidal fluid flow circuit, whereby the impeller is hydrokinetically connected to the turbine. The stator 18 is supported rotatably on a stationary stator sleeve shaft 20, and an overrunning brake 22 anchors the stator to the shaft 20 to prevent rotation of the stator in a direction opposite the direction of rotation of the impeller, although free-wheeling motion in the opposite direction is permitted.

The torque converter includes a lockup clutch 24 located within the torque converter impeller housing 26. When clutch 24 is engaged, the turbine and impeller are mechanically connected to a transmission input shaft 28; when clutch 24 is disengaged, the turbine and impeller are hydrokinetically connected and mechanically disconnected. Fluid contained in the torque converter is supplied to the torque converter from the output of an oil pump assembly and is returned to an oil sump, to which an inlet of the pump is connected hydraulically.

A planetary gear system includes first and second gear units 30, 32. The first gear unit 30 is a compound planetary, speed reduction gear unit, which includes a sun gear 34 secured to the input 28, a ring gear 36, a carrier 38, first planet pinions 39 supported on the carrier and meshing with the sun gear, and second planet pinions 40 supported on the carrier and meshing with the ring gear and first planet pinions. The carrier 38 is grounded on the transmission case.

The gear ratio of a power path or a transmission is the ratio of the speed of its input to the speed of its output. Ring gear 36 is underdriven relative to the speed of input 28 at 0.444 times the speed of input 28, for the specific example set forth in FIG. 3, which lists the number of gear teeth on the gears and pinions of the transmission 10. The gear ratio produced by the speed reduction gearset 30 is therefore greater than unity.

The second gear unit 32 is a Ravigneaux gearset, which includes axially spaced sun gears 42, 44, a ring gear 46, carrier 50, long planetary pinions 48 rotatably supported on carrier 50, and short planetary pinions 52 rotatably supported on carrier 50. The long planetary pinions 48 are in meshing engagement with ring gear 46 and sun gear 44. The short planetary pinions 52 are in meshing engagement with sun gear 42 and long planetary pinions 48. The ring gear 46 of the gear unit 32 is driveably connected to output 60.

Ring gear 36 of gear unit 30 is alternately driveably connected to and disconnected from sun gear 42 by clutch 62. Ring gear 36 of gear unit 30 is alternately driveably connected to and disconnected from sun gear 44 by clutch 64. Sun gear 44 is alternately held against rotation, preferably on the transmission case, upon engagement of a brake 66 and is released for free rotation upon disengagement of brake 66. Carrier 50 is alternately held against rotation, preferably on the transmission case, upon engagement of brake 68 and is released for free rotation upon disengagement of brake 68. Carrier 50 is alternately driveably connected to and disconnected from input 28 by clutch 70. Sun gear 44 of gear unit 32 is alternately driveably connected to and disconnected from input 28 by clutch 72.

Clutches 62, 64, 70, 72 and brakes 66, 68 are preferably hydraulically-actuated friction devices having sets of interleaved friction discs and spacer plates, the discs being secured to one element of the clutch or brake, the spacer plates secured to another element of the clutch or brake. When hydraulic pressure increases in the cylinder of a servo that actuates a respective friction element, the discs and plates of the respective friction element are forced by displacement of the servo piston into mutual frictional contact, thereby producing a drive connection between the components of the gear units, to which the elements of the clutch or brake are secured. When the pressure is vented from the servo cylinder, the clutch or brake is disengaged and the components are free to rotate independently. U.S. Pat. No. 4,943,921 describes and illustrates examples of hydraulically actuated friction clutches and brakes, which can be used in the transmission of this invention.

Operation of the transmission is described next with reference to the engaged and disengaged state of the friction elements, which states in combination produce each of the gear ratios. Preferably, the states of the clutches and brakes are changed automatically in accordance with execution of a control algorithm by an electronic transmission controller. FIG. 2 is a chart indicating the state of engagement and disengagement of the clutches and brakes corresponding to each the gear ratios. In the chart, symbol "X" identifies an engaged friction clutch and friction brake. A blank indicates that the corresponding clutch and brake is disengaged or released. FIG. 2 shows for each forward and reverse gear the operating state of the clutches and brakes that control the transmission of FIG. 1 and the speed ratio for the respective gear.

The transmission operates in the first forward gear when clutch 62 and brake 68 are engaged, and the other friction elements are disengaged. Ring gear 36 of gearset 30 and sun gear 42 are underdriven at the speed ratio of gearset 30 due to clutch 62 being engaged. Carrier 50 produces a torque reaction due to its being held against rotation on the transmission case. With carrier 50 held against rotation and sun gear 44 underdriven, gear unit 32 produces an additional speed reduction causing ring gear 46 and output 60 to be underdriven relative to the speed of sun gear 42. With the transmission operating in first gear, the ratio of the speed of input 28 and the speed of output 60 is 6.387, provided the number of gear teeth of the pinions and gears is as set forth in FIG. 3.

As FIG. 2 shows, the transmission operates in each of the five lowest forward gears when clutch 62 is engaged; therefore, when the transmission 10 operates in each of the five lowest forward gears, sun gear 42 is underdriven relative to the speed of input 28.

An upshift to the second speed ratio results by maintaining clutch 62 engaged, engaging brake 66, and disengaging brake 68. Sun gear 42 is underdriven relative to the speed of input 28 due to the speed reduction produced in gear unit 30. Sun gear 44, fixed against rotation due to the engagement of brake 66, provides a torque reaction. The ring gear 46 and output 60 are underdriven relative to sun gear 42 due to a second speed reduction produced in gear unit 32. With the transmission operating in second gear, the ratio of the speed of input 28 and the speed of output 60 is 3.498, provided the number of gear teeth of the pinions and gears is as set forth in FIG. 3.

An upshift to third gear from second gear results upon disengaging brake 66, engaging clutch 64, and maintaining clutch 62 engaged. Ring gear 36, and sun gears 42, 44 are underdriven relative to the speed of the input 28 due to the speed reduction produced in gear unit 30, thereby locking-up gear unit 32 such that pinion 48 do not rotate and driving its ring gear 46 and output 60 at the speed of sun gears 42, 44. With the transmission operating in third gear, the ratio of the speed of input 28 and the speed of output 60 is 2.250.

An upshift to fourth gear from third gear results upon engaging clutch 72, disengaging clutch 64, and maintaining clutch 62 engaged. Clutch 72 driveably connects sun gear 44 and input 28. Clutch 62 driveably connects ring gear 36 to sun gear 42. Due to the speed reduction produced in gear unit 30, ring sun gear 42 is underdriven relative to the speed of the input 28. With the transmission operating in fourth gear, the ratio of the speed of input 28 and the speed of output 60 is 1.556, provided the number of gear teeth of the pinions and gears is as set forth in FIG. 3.

An upshift to fifth gear from fourth gear results by maintaining clutch 62 engaged, engaging clutch 70, and disengaging clutch 72. Sun gear 42 of gear unit 32 is underdriven through clutch 62 relative to the speed of input 28 due to the speed reduction that occurs in gear unit 30. Carrier 50 is driven at the speed of input 28 through clutch 70. With the transmission operating in fifth gear, the ratio of the speed of input 28 and the speed of output 60 is 1.243, provided the number of gear teeth of the pinions and gears is as set forth in FIG. 3.

An upshift to sixth gear from fifth gear results upon engaging clutch 72, disengaging clutch 62, and maintaining clutch 70 engaged. With the friction elements so disposed, clutch 70 driveably connects input 28 to carrier 50 of gear unit 32, and clutch 72 driveably connects input 28 to sun gear 44 of the gear unit 32. The second gear unit 32 is locked-up; therefore, its ring gear 46 and output 60 rotate at the speed of the input 28. With the transmission operating in sixth gear, the ratio of the speed of input 28 and the speed of output 60 is 1.000.

An upshift to seventh gear from sixth gear results upon engaging clutch 64, disengaging clutch 72, and maintaining clutch 70 engaged. Clutch 64 driveably connects ring gear 36 of gear unit 30 to sun gear 44 of gear unit 32, and clutch 70 driveably connects input 28 to carrier 50 of gear unit 32. A torque reduction and speed increase produced in the gear unit 32 causes ring gear 46 and output 60 to rotate faster than the speed of input 28. With the transmission operating in seventh gear, the ratio of the speed of input 28 and the speed of output 60 is 0.807, provided the number of gear teeth of the pinions and gears is as set forth in FIG. 3

An upshift to eighth gear from seventh gear results upon engaging brake 66, disengaging clutch 64, and maintaining clutch 70 engaged. With the friction control elements so disposed, clutch 70 driveably connects input 28 to carrier 50 of gear unit 32, and brake 66 holds sun gear 44 of gear unit 32 against rotation, thereby providing a torque reaction. Gear unit 32 produces a torque reduction and speed increase, which overdrives its ring gear 46 and output 60 relative to the speed of input 28. With the transmission operating in eighth gear, the ratio of the speed of input 28 and the speed of output 60 is 0.698, provided the number of gear teeth of the pinions and gears is as set forth in FIG. 3.

A low-speed reverse gear is produced upon engaging clutch 64 and brake 68 concurrently, and releasing the other friction elements. Ring gear 36, the underdriven output of gear unit 30, underdrives sun gear 44 through clutch 64 in a forward direction. With carrier 50 held against rotation by brake 68 and producing a torque reaction, gear unit 32 produces a second torque amplification and speed reduction, which further underdrives ring gear 46 and output 60 and reverses the direction of their rotation relative to those of input 28. With the transmission operating in low-reverse gear, the ratio of the speed of input 28 and the speed of output 60 is −5.211, provided the number of gear teeth of the pinions and gears is as set forth in FIG. 3.

A higher-speed reverse gear is produced upon engaging clutch 72 and brake 68, and releasing the other friction elements. Clutch 72 driveably connects sun gear 44 of gear unit 32 and the input 28. With carrier 50 held against rotation on the housing by brake 68 and producing a torque reaction, gear unit 32 produces a torque amplification and speed reduction, which underdrives ring gear 46 and output 60 and reverses the direction of their rotation relative to those at input 28. With the transmission operating in high-reverse gear, the ratio of the speed of input 28 and the speed of output 60 is −2.316, provided the number of gear teeth of the pinions and gears is as set forth in FIG. 3.

The planetary gear unit formed by gear units 30, 32 includes six rotating members. A first member 74 connects clutch 62 and the sun gear 42 of gear unit 32. The second member 76 connects clutch 64 and sun gear 44 of gear unit 32. The third member 84 connects clutch 70 to carrier 50 of gear unit 32. The fourth member 80 connects clutch 72 and sun gear 44 of gear unit 32. The fifth member 82 connects brake 66 and sun gear 44 of gear unit 32. The sixth member 78 connects brake 68 and carrier 50 of gear unit 32.

Figure 4:
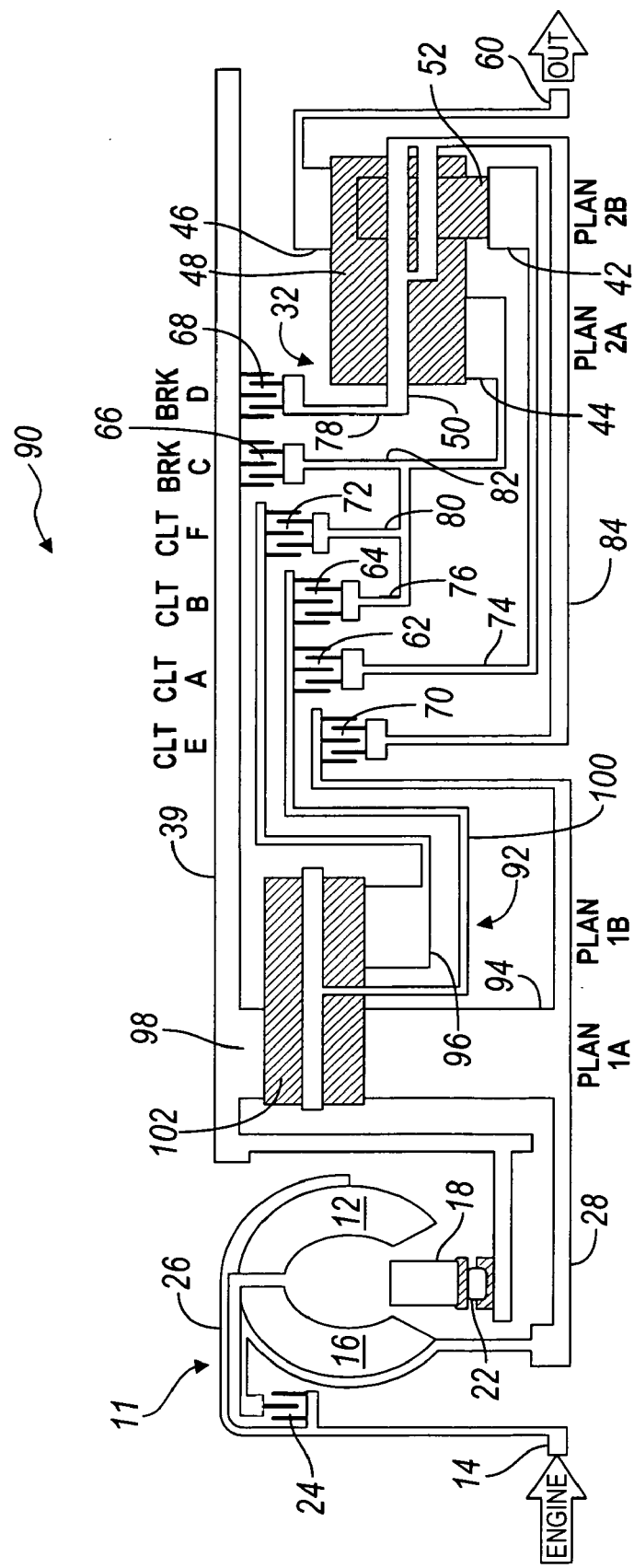
FIG. 4 is a schematic diagram illustrating a second embodiment of a transmission, which incorporates a Ravigneaux gear set.

FIG. 4 illustrates the kinematic arrangement of an automatic transmission 90, in which the Ravigneaux gear unit 32 is as shown in FIG. 1. In FIG. 4, each component that is identical to a component shown in FIG. 1 is referenced with the identical numeral as that used in FIG. 1 for the respective component. The speed reduction gear unit 92 includes a first sun gear 94 secured to input 28, a second sun gear 96, ring gear 98 grounded on the housing, a carrier 100, and planet pinions 102 supported on carrier 100 and meshing with sun gears 94, 96 and ring gear 98. As FIG. 6 shows, the sun gears 94, 96 have 60 gear teeth. With ring gear 98 held against rotation and sun gear 94 driven by the input 28, carrier 100 is underdriven at 0.400 times the speed of the input 28, and sun gear 96 rotates at the speed of the input.

Clutch 62 alternately driveably connects and disconnects the carrier 100 of the speed reduction gear set 30 and sun gear 42 of gear unit 32. Clutch 64 alternately connects and disconnects the carrier 100 of the speed reduction gear set 30 and sun gear 44 of gear unit 32. Brake 66 alternately releases and holds sun gear 44 of gear unit 32 against rotation. Brake 68 alternately releases and holds carrier 50 of gear unit 32 against rotation. Clutch 70 alternately driveably connects and disconnects the input 28 and carrier 50 of gear unit 32. Clutch 72 alternately driveably connects and disconnects the sun gear 96 of the speed reduction gear set 30 and sun gear 44 of gear unit 32. The engaged and disengaged states of the clutches 62, 64, 70, 72 and the brakes 66, 68 for each of the eight forward gears and the two reverse gears of transmission 90 are the same as for transmission 10 shown in FIG. 1. The speed ratios produced by transmission 90 are shown in FIG. 5, provided the number of gear teeth of the pinions and gears is as set forth in FIG. 6.

The planetary gear unit formed by gear units 92, 32 includes six rotating members. The first member 74 connects clutch 62 and the sun gear 42 of gear unit 32. The second member 76 connects clutch 64 and sun gear 44 of gear unit 32. The third member 84 connects clutch 70 and carrier 50 of gear unit 32. The fourth member 80 connects clutch 72 and sun gear 44 of gear unit 32. The fifth member 82 connects brake 66 and sun gear 44 of gear unit 32. The sixth member 78 connects brake 68 and carrier 50 of gear unit 32.

In accordance with the provisions of the patent statutes, the preferred embodiment has been described. However, it should be noted that the alternate embodiments can be practiced otherwise than as specifically illustrated and described.

What is claimed is:

1. A multiple-speed automatic transmission comprising:
an input;
an output;
a Ravigneaux gearset including a first sun gear secured to a first rotating member; a second sun gear secured to a second rotating member, a fourth rotating member and a fifth rotating member; a first ring gear secured to the output; a first carrier secured to a third and a sixth rotating members; first planet pinions rotatably supported on the first carrier and meshing with the first sun gear; second planet pinions rotatably supported on the first carrier and meshing with the second sun gear, first planet pinions and a first ring gear;
a first clutch being operable to connect the first gear unit output and the first rotating member;
a second clutch being operable to connect the first gear unit output and the second rotating member;

a third clutch being operable to connect the third rotating member and the input;

fourth clutch being operable to connect the fourth rotating member and the input;

a first brake being operable to hold the fifth rotating member against rotation;

a second brake being operable to hold the sixth rotating member against rotation;

a first gear unit producing a gear ratio greater than unity and including a third sun gear secured to the input, the third clutch and the fourth clutch; a second ring gear secured to the first and second clutches; a second carrier grounded against rotation and secured to the first brake; third planet pinions supported on the second carrier and meshing with the third sun gear; and fourth planet pinions supported on the second carrier and meshing with the third planet pinions, and the second ring gear.

2. The transmission of claim 1 wherein operation in a forward gear or a reverse gear is produced by concurrent engagement of two of the group consisting of the first clutch, the second clutch, the third clutch, the fourth clutch, the first brake, and the second brake.

3. The transmission of claim 1 wherein engagement of the first clutch and the second brake and disengagement of the second clutch, the third clutch, the fourth clutch, and the first brake produce a first forward gear having a first gear ratio.

4. The transmission of claim 1 wherein engagement of the first clutch and the first brake and disengagement of the second clutch, the third clutch, the fourth clutch, and the second brake produce a second forward gear having a second gear ratio that is less than a first gear ratio.

5. The transmission of claim 1 wherein engagement of the first clutch and the second clutch and disengagement of the third clutch, the fourth clutch, the first brake, and the second brake produce a third forward gear having a third gear ratio that is less than a second gear ratio.

6. The transmission of claim 1 wherein engagement of the first clutch and the fourth clutch and disengagement of the second clutch, the third clutch, the first brake, and the second brake produce a fourth forward gear having a fourth gear ratio that is less than a third gear ratio.

7. The transmission of claim 1 wherein engagement of the first clutch and the third clutch and disengagement of the second clutch, the fourth clutch, the first brake, and the second brake produce a fifth forward gear having a fifth gear ratio that is less than a fourth gear ratio.

8. The transmission of claim 1 wherein engagement of the third clutch and the fourth clutch and disengagement of the first clutch, the second clutch, the first brake, and the second brake produce a sixth forward gear having a sixth gear ratio that is less than a fifth gear ratio.

9. The transmission of claim 1 wherein engagement of the second clutch and the third clutch and disengagement of the first clutch, the fourth clutch, the first brake, and the second brake produce a seventh forward gear having a seventh gear ratio that is less than a sixth gear ratio.

10. The transmission of claim 1 wherein engagement of the first brake and the third clutch and disengagement of the first clutch, the second clutch, the fourth clutch, and the second brake produce an eighth forward gear having an eighth gear ratio that is less than a seventh gear ratio.

11. The transmission of claim 1 wherein engagement of the second clutch and the second brake and disengagement of the first clutch, the third clutch, the fourth clutch, and the first brake produce a low speed reverse gear having a first reverse gear ratio.

12. The transmission of claim 1 wherein engagement of the fourth clutch and the second brake and disengagement of the first clutch, the second clutch, the third clutch, and the first brake produce a relatively higher reverse gear having a gear ratio that is greater than the first reverse gear ratio.

13. A multiple-speed automatic transmission comprising:
an input;
an output;
a Ravigneaux gearset including a first sun gear; a second sun gear; a first ring gear secured to the output; a first carrier; first planet pinions rotatably supported on the first carrier and meshing with the first sun gear; second planet pinions rotatably supported on the first carrier and meshing with the second sun gear, the first planet pinions and the first ring gear;
a first gear unit including a third sun gear; a second ring gear; a second carrier grounded against rotation; third planet pinions supported on the second carrier and meshing with the third sun gear; and fourth planet pinions supported on the second carrier and meshing with the third planet pinions and the second ring gear;
a first clutch being operable to connect the second ring gear and the first sun gear;
a second clutch being operable to connect the second ring gear and the second sun gear;
a third clutch being operable to connect the first carrier and the input;
a fourth clutch being operable to connect the second sun gear and the input;
a first brake being operable to hold the second sun gear against rotation; and
a second brake being operable to hold the first carrier against rotation;
a low-reverse gear producing a second reverse gear ratio less than a first reverse gear ratio when the fourth clutch and second brake are engaged.

14. The transmission of claim 13, wherein:
the low-reverse gear has the first reverse gear ratio that is produced when the second clutch and second brake are engaged.

* * * * *